United States Patent
Matsuoka

(10) Patent No.: US 8,537,418 B2
(45) Date of Patent: Sep. 17, 2013

(54) IMAGE PROCESSING DEVICE, IMAGE FORMING APPARATUS INCORPORATING SAME, IMAGE PROCESSING METHOD USED IN THE IMAGE FORMING APPARATUS, AND PROGRAM PRODUCT USED IN THE IMAGE FORMING APPARATUS

(75) Inventor: Taira Matsuoka, Soka (JP)

(73) Assignee: Ricoh Company, Limited, Tokyo (JP)

( * ) Notice: Subject to any disclaimer, the term of this patent is extended or adjusted under 35 U.S.C. 154(b) by 894 days.

(21) Appl. No.: 12/654,479

(22) Filed: Dec. 22, 2009

(65) Prior Publication Data
US 2010/0165368 A1 Jul. 1, 2010

(30) Foreign Application Priority Data
Dec. 25, 2008 (JP) .................................. 2008-329101

(51) Int. Cl.
*G06F 15/00* (2006.01)
*G06K 7/00* (2006.01)
*G06K 7/10* (2006.01)

(52) U.S. Cl.
USPC ............................. 358/1.9; 382/312; 382/321

(58) Field of Classification Search
USPC .................................. 358/1.9; 382/312, 321
See application file for complete search history.

(56) References Cited

U.S. PATENT DOCUMENTS 6,456,748 B1 * 9/2002 Yushiya et al. ............... 382/312
2009/0141310 A1  6/2009 Matsuoka

FOREIGN PATENT DOCUMENTS

JP    04-227371    8/1992
JP    2001-086353  3/2001

* cited by examiner

*Primary Examiner* — Charlotte M Baker
(74) *Attorney, Agent, or Firm* — Harness, Dickey & Pierce, P.L.C.

(57) ABSTRACT

An image processing device, which can be incorporated in an image forming apparatus and perform an image processing method, includes a first image sensor unit including multiple image sensor chips arranged in a line to read an image of a document by converting light incident from the document into electrical signals, a chroma calculation unit to calculate chroma data from an image signal constituted by the electrical signals of the image read by the first image sensor unit, and a chroma adjustment unit to adjust the chroma by using the chroma data calculated by the chroma calculation unit to perform, only on a low-chroma image signal, a conversion process for reducing the chroma to suppress color irregularities occurring at intervals corresponding to widths of the multiple image sensor chips of the first image sensor unit.

12 Claims, 8 Drawing Sheets

FIG. 11
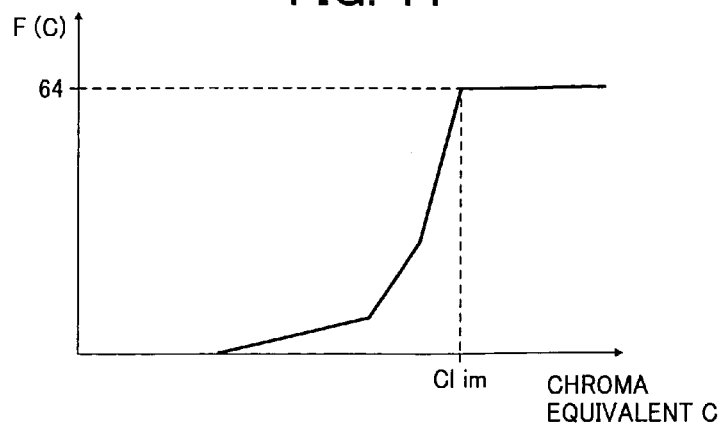
FIG. 12
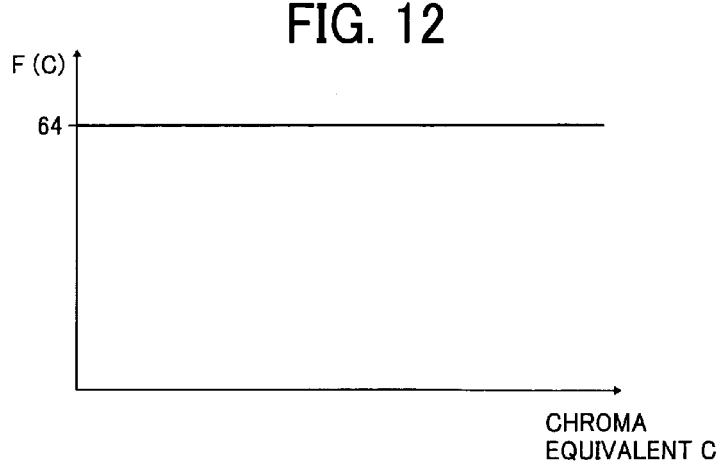
FIG. 13
|  | FIRST SETTING | SECOND SETTING | THIRD SETTING | FOURTH SETTING |
|---|---|---|---|---|
| FIRST READING METHOD: DUPLEX DOCUMENT READING MECHANISM (ADF: CIS READING) | ON | ON | ON | OFF |
| SECOND READING METHOD: DUPLEX DOCUMENT READING MECHANISM (ADF: CCD READING) | ON | ON | OFF | OFF |
| THIRD READING METHOD: SECOND DOCUMENT READING MECHANISM (DOCUMENT FIXED: CCD READING) | ON | OFF | OFF | OFF |

IMAGE PROCESSING DEVICE, IMAGE FORMING APPARATUS INCORPORATING SAME, IMAGE PROCESSING METHOD USED IN THE IMAGE FORMING APPARATUS, AND PROGRAM PRODUCT USED IN THE IMAGE FORMING APPARATUS

CROSS-REFERENCE TO RELATED APPLICATION

The present patent application claims priority pursuant to 35 U.S.C. §119 from Japanese Patent Application No. 2008-329101, filed on Dec. 25, 2008 in the Japan Patent Office, which is hereby incorporated by reference herein in their entirety.

BACKGROUND OF THE INVENTION

1. Field of the Invention

The present patent application relates to an image processing device adapted to devices such as a facsimile machine, a printer, a scanner, a copier, a multifunctional machine, and a personal computer; an image forming apparatus such as a facsimile machine, a printer, a scanner, a copier, and a multifunctional machine; an image processing method performed by the image processing device and the image forming apparatus; and a program executed by the image processing device and the image forming apparatus.

2. Discussion of the Background Art

As a document reading method performed by an image reading device, a method has been commonly used which illuminates a document with the light emitted from, for example, a xenon lamp serving as a light source, and causes an image sensor to read the reflected light from the document through a reduction optical system.

Recently, however, a so-called contact image sensor (CIS) has started to be widely used for the purpose of reducing the size of a device. In a CIS, which uses a small-sized LED as a light source, an image is directly read by a linear sensor through a SELFOC™ lens, for example (SELFOC is a registered trademark of NSG America, Inc.). Further, a so-called multi-chip image sensor array has come to be widely used as the image sensor used in the CIS as described above, in which photoelectric conversion sensor chips are arranged in multiple lines in the main scanning direction. One problem with the multi-chip, image sensor array, however, is that the chips forming the array have different characteristics. As a result, in the read image of a document, therefore, color irregularities occur at intervals corresponding to the widths of the chips. In extreme cases, a striped pattern may appear in the read image data.

A background technique proposes to read a test chart by using an image sensor array, calculate a color correction coefficient for each of chips, and then perform conversion for each of the chips by setting one color space as the target.

Further, in recent years, an image reading device has started to be widely used which uses an automatic document feeder (ADF) to read both surfaces of a document substantially simultaneously (i.e., not exactly simultaneously, but during the same document conveying operation). For example, in a simultaneous duplex reading operation by the image reading device according to another background technique, when the image reading device reads a document using a fixed optical system during conveyance of the document, the image reading device reads one side of the document by using a reading device called CIS which includes a multi-chip image sensor, and reads the other side of the document by using a reduction optical system which includes a charge-coupled device (CCD) as an image sensor.

The above-described first background technique, however, exhibits insufficient color correction among chips, and thus causes color irregularities. Even if the accuracy of the color correction among chips is improved by a calibration technique and so forth, it is difficult to perfectly adjust the respective colors of the chips to an intended color, and thus an error occurs. In particular, if the output color fluctuates in a low-chroma area, and if the color is reproduced with a chroma higher than an intended chroma, humans in general easily recognize such fluctuation as color irregularities. The nature of human vision is such that humans find a color change more easily in an achromatic color than in a chromatic color, and thus are more sensitive to a change occurring in an achromatic area.

Meanwhile, in the above-described second background technique, if processing to suppress the color irregularities attributed to the multi-chip image sensor is performed on the CCD image sensor, the chroma of a low-chroma area is unnecessarily reduced. Therefore, it is generally considered that chroma conversion processing to suppress color irregularities should be avoided in the reading operation performed by the CCD image sensor.

However, the chroma in a low-chroma area is different between the respective images of the front and rear surfaces of a document read by the simultaneous duplex reading operation using the ADF, and between the image read by the simultaneous duplex reading operation and the image read by a book-reading operation of reading a fixed document, i.e., a method of reading a document fixed on a contact glass by scanning the document with the use of an optical reading system. Such a difference in chroma may be recognized as a difference in image. Therefore, some users may rather want to perform equal chroma conversion processing in both the reading operation by the multi-chip image sensor and the reading operation by the CCD image sensor.

SUMMARY OF THE INVENTION

The present patent application describes an image processing device. In one example, an image processing device includes a first image sensor unit, a chroma calculation unit, and a chroma adjustment unit. The first image sensor unit includes multiple image sensor chips arranged in a line to read an image of a document by converting light incident from the document into electrical signals. The chroma calculation unit calculates chroma data from an image signal constituted by the electrical signals of the image read by the first image sensor unit. The chroma adjustment unit adjusts the chroma by using the chroma data calculated by the chroma calculation unit to perform, only on a low-chroma image signal, a conversion process for reducing the chroma to suppress color irregularities occurring at intervals corresponding to widths of the multiple image sensor chips of the first image sensor unit.

The chroma adjustment unit may reduce the chroma of only image data having a chroma equal to or less than a predetermined first value.

The predetermined first value may be varied according to a specified second value.

The above-described image processing device may further include a first document reading mechanism in which the first image sensor unit is incorporated. The first document reading mechanism may further incorporate a second image sensor unit different from the first image sensor unit. The first document reading mechanism may perform duplex document reading by reading an image of a first side of a document by using the first image sensor unit and reading an image of a second side of the document by using the second image sensor unit. The suppression of color irregularities may be performed only on the image read by the first image sensor unit of the first document reading mechanism.

According to this image processing device, the first document reading mechanism may further include a second document reading mechanism movable in a direction of movement of the document. The second document reading mechanism may rest at a fixed position when reading an image of a moving document that is being moved, and may move when reading an image of a fixed document that is placed at a position for document reading. The first document reading mechanism may use the first image sensor unit to read the image of the first side of the document and the second image sensor unit to read the image of the second side of the document, and the second document reading mechanism may use the second image sensor unit to read the images of the first and second sides of the document. The suppression of color irregularities may be performed selectively on three types of image data. The three types of image data may include the image of the moving document read by the first image sensor unit, the image of the moving document read by the second image sensor unit, and the image of the fixed document read by the second image sensor unit.

According to this image processing device, the suppression of color irregularities may not be performed on the image of the fixed document read by the second image sensor unit.

The above-described image processing device may further include the first document reading mechanism incorporating the first image sensor unit and the second image sensor unit, and perform duplex document reading by reading an image of a first side of a document by using the first image sensor unit and reading an image of a second side of the document by using the second image sensor unit. The suppression of color irregularities may be performed on both the image read by the first image sensor unit and the image read by the second image sensor unit according to results obtained by which the first document reading mechanism reads both the first and second sides of the document. The suppression of color irregularities may not be performed on the image read by the second image sensor unit according to results obtained by which the first document reading mechanism reads only one side of the document.

According to this image processing device, the first document reading mechanism may further include a second document reading mechanism movable in a direction of movement of the document. The second document reading mechanism may rest at a fixed position when reading an image of a moving document that is being moved, and may move when reading an image of a fixed document that is placed at a position for document reading. The first document reading mechanism may use the first image sensor unit to read the image of the first side of the document and the second image sensor unit to read the image of the second side of the document, and the second document reading mechanism may use the second image sensor unit to read the images of the first and second sides of the document. The suppression of color irregularities may be performed selectively on three types of image data. The three types of image data may include the image of the moving document read by the first image sensor unit, the image of the moving document read by the second image sensor unit, and the image of the fixed document read by the second image sensor unit.

According to this image processing device, the suppression of color irregularities may not be performed on the image of the fixed document read by the second image sensor unit.

The present patent application further describes an image forming apparatus. In one example, an image forming apparatus includes the above-described image processing device, and an image forming unit to form an image based on image data output from the image processing device and transfer the formed image onto a recording medium.

The present patent application further describes an image processing method. In one example, an image processing method includes: reading an image of a document by using a first image sensor unit including multiple image sensor chips arranged in a line to convert light incident from the document into electrical signals; calculating, chroma data from an image signal constituted by the electrical signals of the image read at the reading; adjusting the chroma by using the chroma data calculated at the calculating; and performing, only on a low-chroma image signal, a conversion process for reducing the chroma based on the adjusting to suppress color irregularities occurring at intervals corresponding to widths of the multiple image sensor chips of the first image sensor unit.

The present patent application further describes a program product including a computer-usable medium having computer-readable program code embodied thereon for causing a computer to perform an image processing method. In one example, the method includes: reading an image of a document by using a first image sensor unit including multiple image sensor chips arranged in a line to convert light incident from the document into electrical signals; calculating chroma data from an image signal constituted by the electrical signals of the image read at the reading; adjusting the chroma by using the chroma data calculated at the calculating; and performing, only on a low-chroma image signal, a conversion process for reducing the chroma based on the adjusting to suppress color irregularities occurring at intervals corresponding to widths of the multiple image sensor chips of the first image sensor unit.

BRIEF DESCRIPTION OF THE DRAWINGS

A more complete appreciation of the invention and many of the advantages thereof are obtained as the same becomes better understood by reference to the following detailed description when considered in connection with the accompanying drawings, wherein:

FIG. 11 is another graph illustrating the relationship between the function and the chroma equivalent;

FIG. 12 is another graph illustrating the relationship between the function and the chroma equivalent; and FIG. 13 is a table illustrating an example of combinations of plural types of chroma conversion tables.

DETAILED DESCRIPTION OF PREFERRED EMBODIMENTS

Figure 1:
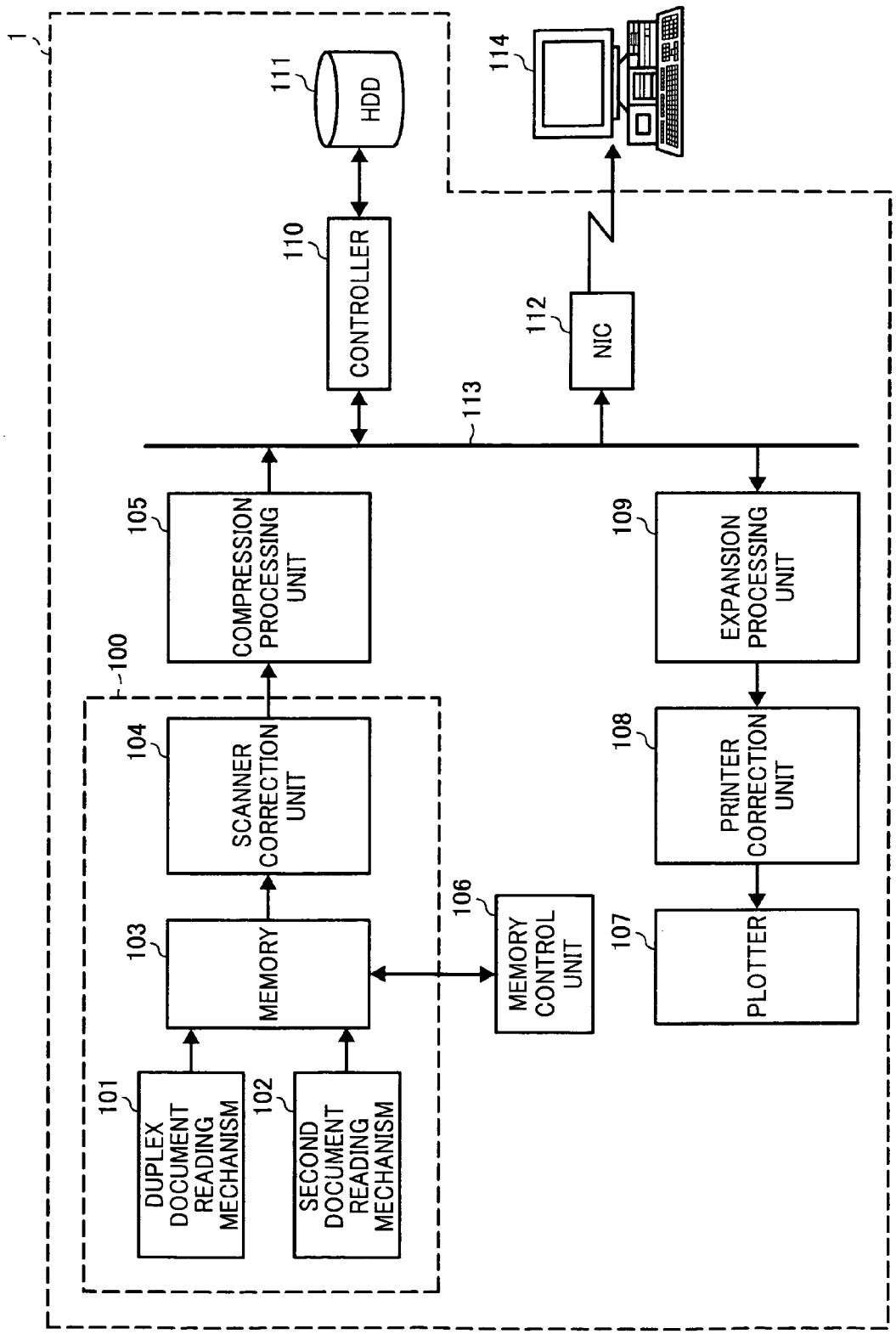
FIG. 1 is a block diagram illustrating a schematic configuration of an image forming apparatus including a digital full-color image processing device according to an example embodiment of the present patent application.

In describing the example embodiments illustrated in the drawings, specific terminology is employed for the purpose of clarity. However, the disclosure of the present patent application is not intended to be limited to the specific terminology so used, and it is to be understood that substitutions for each specific element can include any technical equivalents that operate in a similar manner.

Referring now to the drawings, wherein like reference numerals designate identical or corresponding parts throughout the several views, particularly to FIG. 1, a preferred embodiment for implementing the present patent application will be specifically described below.

FIG. 1 is a block diagram illustrating a schematic configuration of a digital full-color image processing device 100 incorporated in an image forming apparatus 1, according to an example embodiment of the present patent application.

FIG. 1 illustrates a duplex document reading mechanism 101, a second document reading mechanism 102, a memory 103, a scanner correction unit 104, a compression processing unit 105, a memory control unit 106, a plotter 107, a printer correction unit 108, an expansion processing unit 109, a controller 110, a hard disk drive (HDD) 111, a network interface controller (NIC) 112, a general-purpose bus 113, and a personal computer (PC) 114.

When the full-color image processing device 100 operates in the image forming apparatus 1 when serving as a full-color copier, the duplex document reading mechanism 101 and the second document reading mechanism 102 read a document to obtain image data color-separated into red (R), green (G), and blue (B), convert the image data in the form of analog signals into digital data, and output the converted digital data. The respective image data items generated in the duplex document reading mechanism 101 and the second document reading mechanism 102 are temporarily accumulated in the memory 103 having a sufficient capacity. The data accumulated in the memory 103 is output to a subsequent stage, i.e., the scanner correction unit 104 in accordance with the control of the memory control unit 106.

The memory control unit 106 controls the process of accumulating image data in the memory 103 and the process of extracting image data from the memory 103. For example, the duplex document reading mechanism 101 first processes the image data of one surface (herein referred to as a front surface) of a document, and then processes the image data of the other surface (herein referred to as a rear surface) of the document. That is, the images of the two surfaces are all temporarily accumulated in the memory 103. Then, the image data of the front surface is sent out, and thereafter the image data of the rear surface is invoked and sent out from the memory 103. In consecutive reading of documents, the image data of the front surface and the image data of the rear surface are alternately sent out to the scanner correction unit 104. As described later, two image sensor units having different reading characteristics read the front and rear surfaces, respectively. Normally, therefore, it is necessary for the scanner correction unit 104 to perform scanner correction by using separate parameters.

As described later, the scanner correction unit 104 corrects scanner characteristics by performing image processing on the digital RGB image data read by the duplex document reading mechanism 101 or the second document reading mechanism 102. The image processing includes scanner γ correction processing, classification of an image area, i.e., image area separation into text and line art, pattern, and so forth, filter processing for emphasizing a text area and smoothing a pattern area of an image in accordance with the determination result of the image area separation, and conversion of the color read by the reading device into a color space according to the intended use.

The compression processing unit 105 performs compression processing on multi-value image, data subjected to the scanner correction by the scanner correction unit 104, and sends the compressed data to the general-purpose bus 113. The compressed image data is sent to the controller 110 via the general-purpose bus 113.

The controller 110 is a microcomputer including therein a central processing unit (CPU), a read-only memory (ROM), and a random access memory (RAM: a semiconductor memory), the illustration of which is omitted here. The controller 110 accumulates, in the RAM, the data sent from the compression processing unit 105.

As described above, the scanner correction unit 104 receives inputs of the images read by two reading sensors having different characteristics. The input timing is controlled by the memory control unit 106 such that the image of the front surface and the image of the rear surface are alternately input. Immediately before the input of the image of the front surface, the parameter for the image of the front surface is set in the scanner correction unit 104. Then, after the processing of the image of the front surface and immediately before the input of the image of the rear surface, the parameter for the image of the rear surface is set in the scanner correction unit 104. Thereby, image processing substantially absorbing the difference in reading characteristic is performed. As a result, it is possible to output images of similar quality from the front and rear surfaces.

Further, in actual control performed in the image forming apparatus 1 when serving as a multifunction peripheral (MFP) including the above-described full-color image processing device 100, for example, there is a central processing unit (CPU) (illustration thereof is omitted here) for controlling the entire MFP. The CPU communicates with the memory control unit 106 and the scanner correction unit 104 to switch between the parameter for the front surface and the parameter for the rear surface, which are previously stored in the not-illustrated ROM, in synchronization with the input and output of images.

Then, the data accumulated in the controller 110 is written, as necessary, in the HDD 111 serving as a storage unit having a relatively large capacity. The image data is written in the HDD 111 to prevent a document from being read again when a sheet jam occurs in a print-out operation by the plotter 107 that serves as an image forming unit and thus the output operation is abnormally completed, to perform electronic sorting for rearrangement of a plurality of document image data items, and to accumulate the image data of read documents and output the image data when necessary. The present example embodiment illustrates the case in which the image data is compressed. However, uncompressed image data may also be handled, if the general-purpose bus 113 has a sufficiently wide bandwidth, and if the HDD 111 accumulating therein the image data has a relatively large capacity.

Then, the controller 110 sends the image data of the HDD 111 to the expansion processing unit 109 via the general-purpose bus 113. The expansion processing unit 109 expands the compressed image data into the original multi-value data, and sends the expanded data to the printer correction unit 108. The printer correction unit 108 performs printer γ correction processing and gradation processing. With the processing of correcting the light and dark characteristics of the plotter 107, error diffusion processing and dither processing according to the gradation characteristic of the plotter 107 and the result of the image area separation, and so forth, the image data is quantized. The plotter 107, which is an image forming unit for printing image on a transfer sheet by using a laser beam writing process, for example, draws a latent image on a photoconductor on the basis of the image data. The latent image is then developed with toner and transferred onto a transfer sheet (i.e., a recording medium). Thereby, a copy image is formed on the transfer sheet.

When the full-color image processing device 100 operates as a distribution scanner for distributing image data to the PC 114 via a network, the image processing device 100 follows a process flow similar to the process flow of the copier up to the compression process. After the compression process, the image data is sent to the controller 110. The controller 110 performs format processing to convert the image data into a general-purpose image format such as the Joint Photographic Experts Group or JPEG format, the Tagged Image File Format or TIFF format, and the Basic Multilingual Plane or BMP format. Thereafter, the image data is distributed to the PC 114, which is an external information processing terminal device, via the NIC 112.

Figure 2:
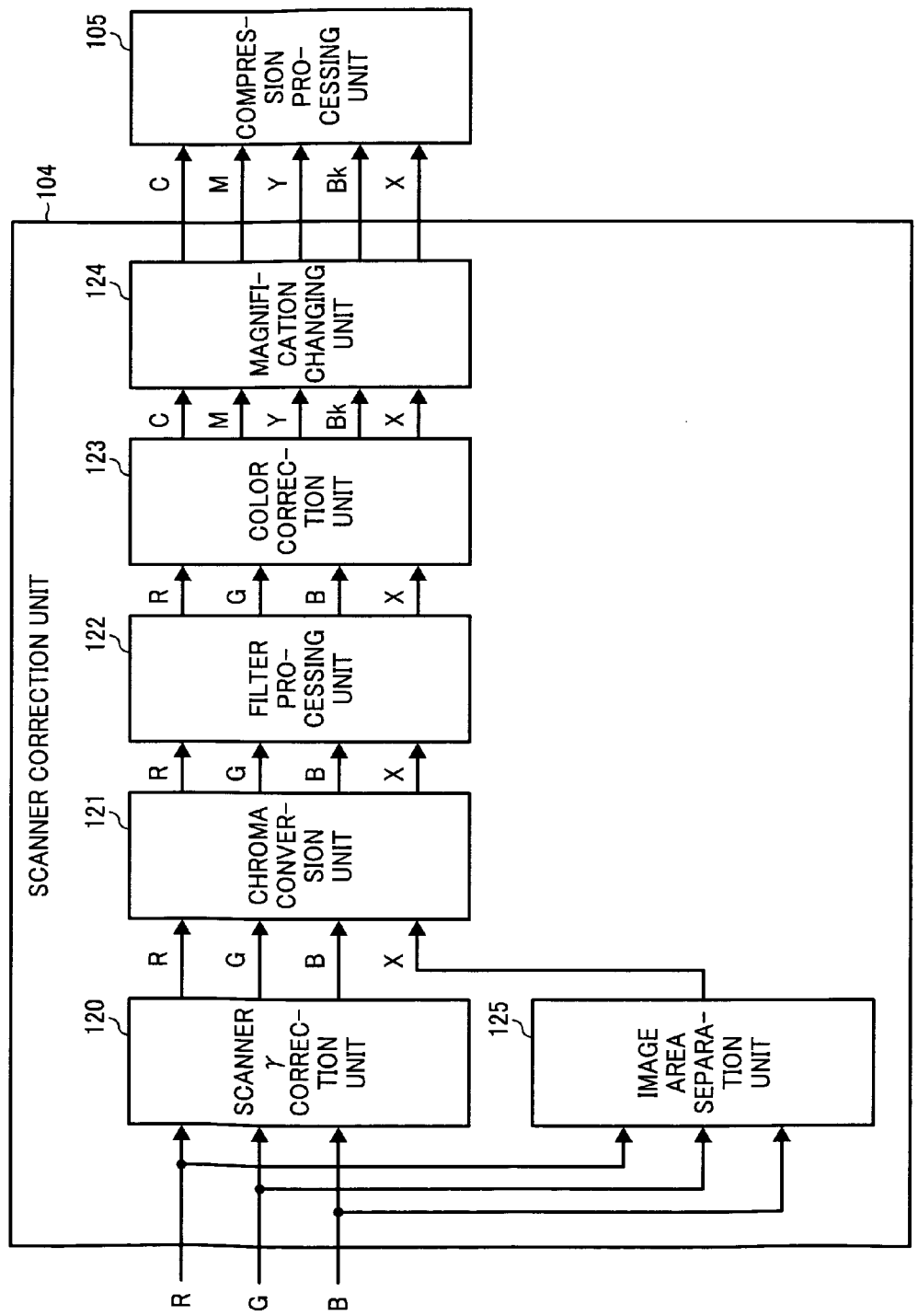
FIG. 2 is a block diagram illustrating an internal configuration of a scanner correction unit illustrated in FIG. 1.

Subsequently, an internal configuration and processing of the scanner correction unit 104 will be described. FIG. 2 is a block diagram illustrating an internal configuration of the scanner correction unit 104 illustrated in FIG. 1. As illustrated in FIG. 2, the scanner correction unit 104 includes an image area separation unit 125, a scanner γ correction unit 120, a chroma conversion unit 121, a filter processing unit 122, a color correction unit 123, and a magnification changing unit 124. On the basis of the respective RGB image data items input from the duplex document reading mechanism 101 or the second document reading mechanism 102, the image area separation unit 125 determines, for example, whether an image area of a document is a text area or a pattern area, or whether the image area is a chromatic area or an achromatic area. The scanner γ correction unit 120 converts the digital values of the RGB image data items according to the scanner characteristic of the duplex document reading mechanism 101 or the second document reading mechanism 102 into digital values proportional to the brightness. The chroma conversion unit 121 adjusts the chroma of an output image in accordance with the chroma of the image data input from the scanner γ correction unit 120. On the basis of data X representing the result of the image area separation performed by the image area separation unit 125, the filter processing unit 122 performs a sharpening process or a smoothing process on the respective RGB image data items. The color correction unit 123 converts the image data color-separated into R, G, and B and subjected to the processing by the filter processing unit 122 into color image data containing recording color information of cyan (C), magenta (M), yellow (Y), and black (K), which form a color space different from the RGB color space. The magnification changing unit 124 increases or reduces the size in the main scanning direction of the input image of the color image data received from the color correction unit 123, and outputs the image.

The drawing illustrates a configuration example in which the signal of the data X representing the result of image area separation is output from the image area separation unit 125 and referred to, as necessary, by the image processing modules, i.e., the chroma conversion unit 121, the filter processing unit 122, the color correction unit 123, the magnification changing unit 124, and the compression processing unit 105. In the present example embodiment, the chroma conversion unit 121 reduces the chroma of a low-chroma area to suppress color irregularities in an image attributed to a multi-chip image sensor. Detailed description thereof will be made later.

Figure 3:
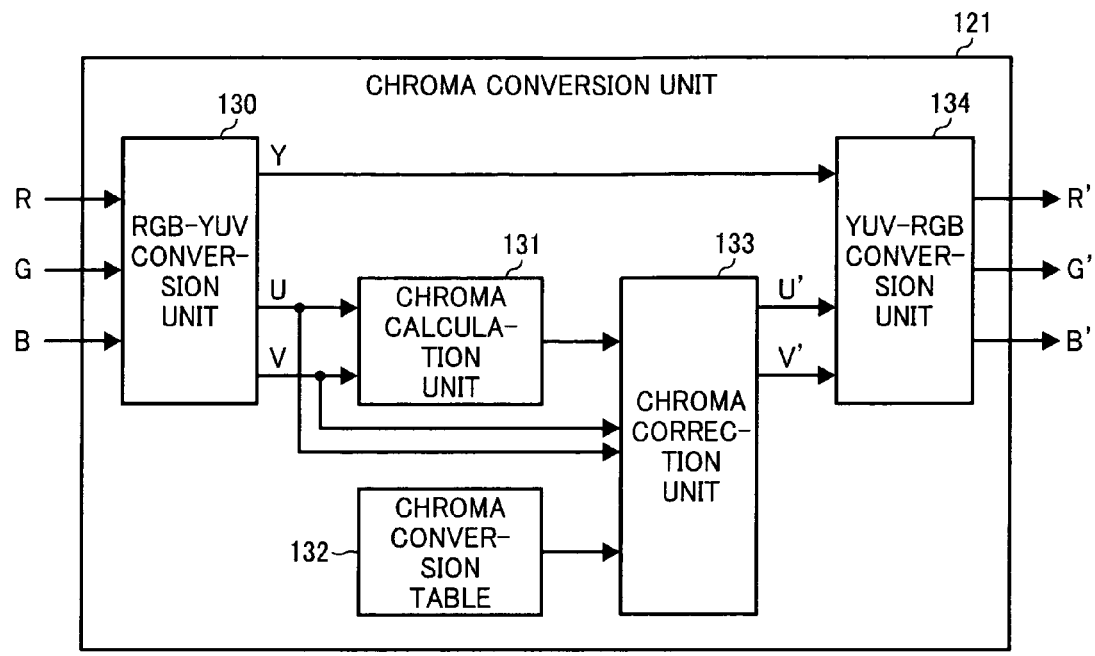
FIG. 3 is a block diagram illustrating an internal configuration of a chroma conversion unit illustrated in FIG. 2.

Subsequently, an internal configuration and processing of the chroma conversion unit 121 included in the scanner correction unit 104 will be described in detail. FIG. 3 is a block diagram illustrating an internal configuration of the chroma conversion unit 121 illustrated in FIG. 2. As illustrated in FIG. 3, the chroma conversion unit 121 includes an RGB-YUV conversion unit 130, a chroma calculation unit 131, a chroma conversion table 132, chroma correction unit 133, and a YUV-RGB conversion unit 134. The RGB-YUV conversion unit 130 performs operation processing based on commonly known equations presented in the following Formula 1 to convert the input RGB image signals into luminance-chromaticity signals.

[Formula 1]

$$Y = R1 + 2 \times G1 + B1 \, (Y\!:\!0 \text{ to } 1020) \qquad \text{Equation (1)}$$

$$U = R1 - G1 \, (U\!:\!-255 \text{ to } 255) \qquad \text{Equation (2)}$$

$$V = B1 - G1 \, (V\!:\!-255 \text{ to } 255) \qquad \text{Equation (3)}$$

With the use of the respective data items U and V calculated in Equations (2) and (3), the chroma calculation unit 131 calculates the square root of U×U+V×V to calculate a chroma equivalent C. That is, the chroma calculation unit 131 performs operation processing based on the equation of the following Formula 2 to calculate the chroma equivalent C.

[Formula 2]

$$C = (U \times U + V \times V)^{(1/2)} \qquad \text{Equation (4)}$$

Figure 4:
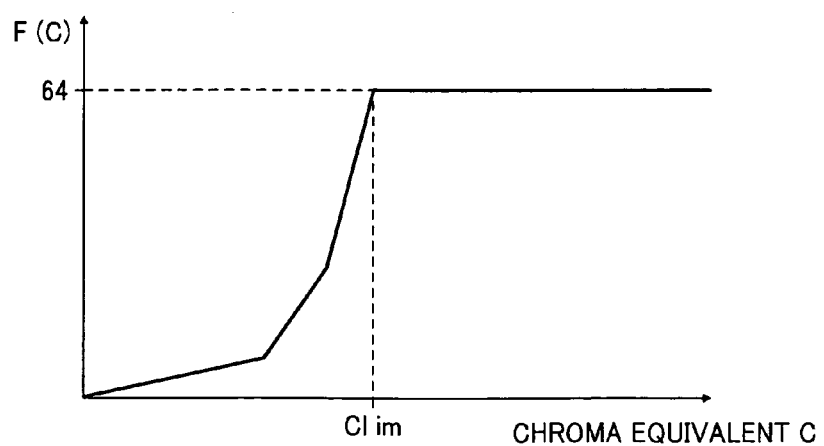
FIG. 4 is a graph illustrating the relationship between a function and a chroma equivalent.

Then, the chroma correction unit 133 that serves as a chroma adjustment unit to perform chroma conversion by using the respective data items U and V of the input image and the value calculated by the chroma calculation unit 131. Referring to the chroma conversion table 132, the chroma correction unit 133 performs operation processing based on the equations presented in the following Formula 3 to perform chroma conversion. In the chroma conversion table 132, appropriate values represented by, for example, the graph of FIG. 4 illustrating the relationship between a function F(C) and the chroma equivalent C are previously set.

[Formula 3]

$$C' = C \times F(C)/64 \qquad \text{Equation (5)}$$

$$U' = U \times C'/C \qquad \text{Equation (6)}$$

$$V' = V \times C'/C \qquad \text{Equation (7)}$$

In this case, when the value of the function F(C) is 64, the equation "C'/C=1" is derived, and the image having the same chroma as the chroma of the input image is output. In the example illustrated in FIG. 4, if the chroma equivalent C of the input image exceeds a value Clim, the chroma conversion is not performed. Therefore, the chroma of the output image is reduced only when the chroma equivalent C of the input image is equal to or less than the value Clim.

Finally, the YUV-RGB conversion unit 134 converts the data having the updated chroma into RGB image data items. The conversion is performed by the operation processing based on the equations presented in the following Formula 4.

[Formula 4]

$$G'=Y-((U'+V')/2)(G':0 \text{ to } 255) \quad \text{Equation (8)}$$

$$R'=U'+G'(R':0 \text{ to } 255) \quad \text{Equation (9)}$$

$$B'=V'+G'(B':0 \text{ to } 255) \quad \text{Equation (10)}$$

The present example performs the operation processing based on the equation "$C=(U \times U+V \times V)^{(1/2)}$" representing the chroma. However, another indicator may also be used, if the indicator represents the amount equivalent to the chroma. For example, instead of the RGB-YUV conversion performed in the above-described processing, RGB-L*a*b* conversion may be performed, and a* and b* signals may be used in place of U and V signals. Further, an indicator such as "C=ABS(U)+ABS(V)" may also be used to reduce the circuit size. In this case, ABS(A) is a function representing the absolute value of A.

Figure 5:
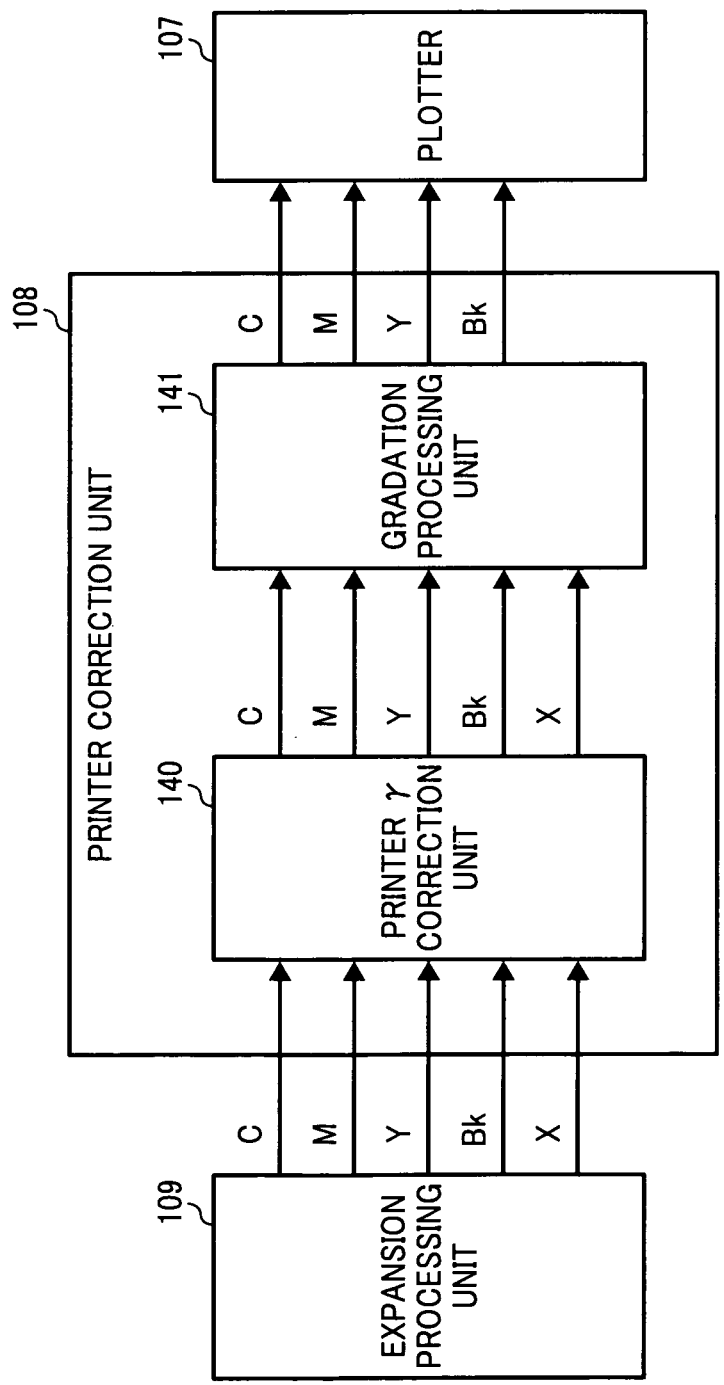
FIG. 5 is a block diagram illustrating an internal configuration of a printer correction unit illustrated in FIG. 1.

Subsequently, an internal configuration and processing of the printer correction unit 108 will be described. FIG. 5 is a block diagram illustrating an internal configuration of the printer correction unit 108 illustrated in FIG. 1. As illustrated in FIG. 5, the printer correction unit 108 includes a printer γ correction unit 140 and a gradation processing unit 141. In accordance with the frequency characteristic of the plotter 107, the printer γ correction unit 140 performs γ correction on the respective CMYK image data items subjected to the processing by the expansion processing unit 109. The gradation processing unit 141 performs quantization such as dither processing and error diffusion processing. The printer correction unit 108 outputs the respective CMYK image data items each having the corrected printer characteristic.

The image data items are sent to the plotter 107. On the basis of the thus sent image data items, the plotter 107 forms an image which is then transferred onto a recording medium. In this manner, the image forming operation is performed. If the signal of the data X representing the determination result of image area separation performed by the image area separation unit 125 indicates an area determined to be text, the printer γ correction unit 140 performs γ correction for emphasizing the contrast. Meanwhile, if the signal of the data X representing the determination result of image area separation indicates a pattern, the printer γ correction unit 140 performs γ correction for emphasizing the gradation reproduction. Further, if the signal of the data X indicates an area determined to be text, the gradation processing unit 141 performs halftone processing for emphasizing the sharpness of text. Meanwhile, if the signal of the data X indicates a pattern, the gradation processing unit 141 performs halftone processing for emphasizing the smoothness of image.

The duplex document reading mechanism 101 and the second document reading mechanism 102 illustrated in FIG. 1 can be realized by a combination of a document feeding device and a scanner device used in a known technique, for example.

Subsequently, with reference to FIGS. 6 and 7, a description will be given of an example configuration of the duplex document reading mechanism 101 and the second document reading mechanism 102.

Figure 6:
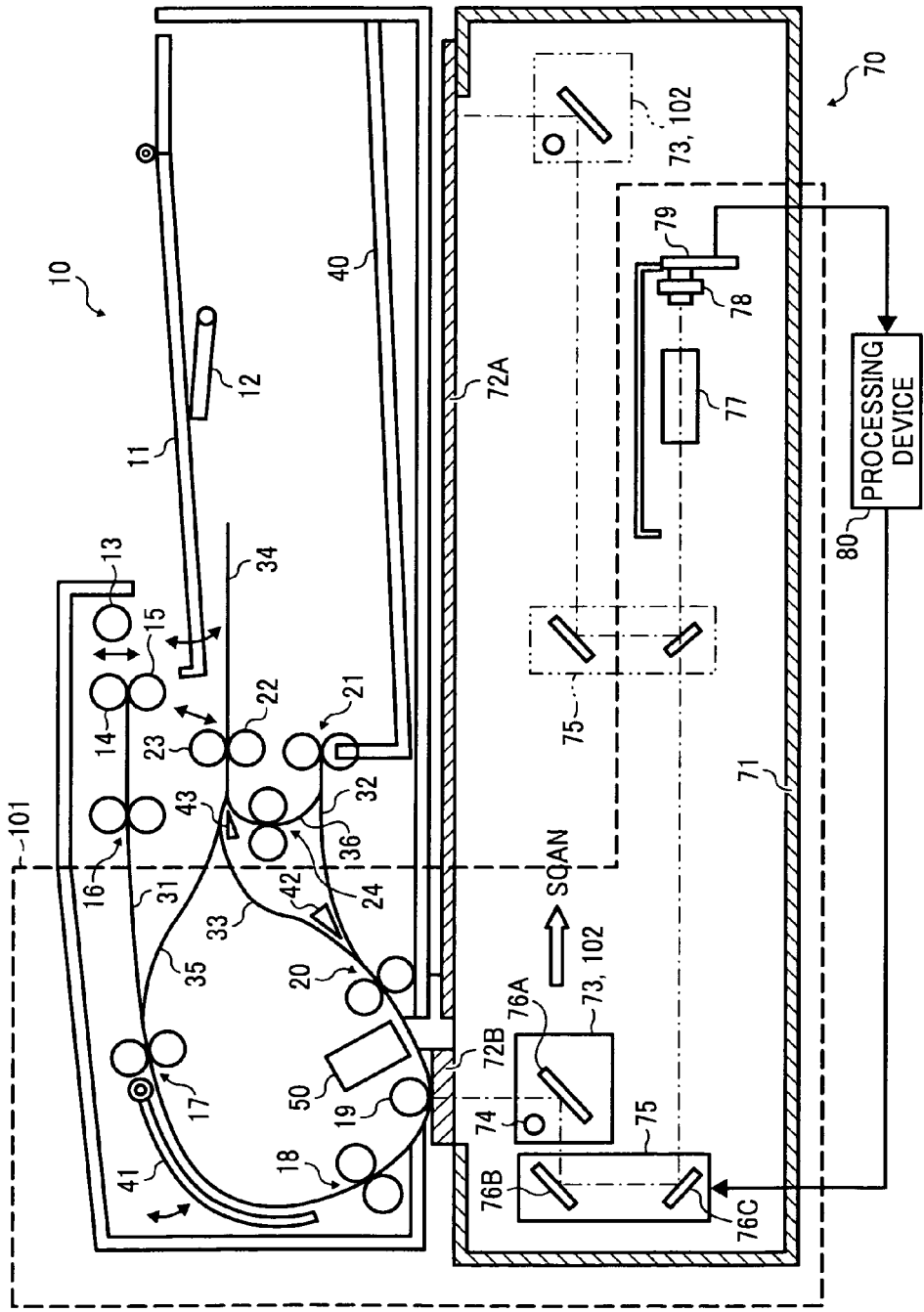
FIG. 6 is a diagram illustrating a configuration example of a document reading mechanism.

FIG. 6 is a diagram illustrating an example configuration of a document reading mechanism. The document reading mechanism is roughly divided into a document feeding device 10 sequentially conveys documents from a bundle of documents stacked thereon, a scanner device 70 which scans and reads images, and a processing device 80 which processes read image signals.

The document feeding device 10 includes a document tray 11 for carrying a document bundle including a plurality of documents stacked thereon, and a tray lifter 12 for lifting and lowering the document tray 11. The document feeding device 10 further includes a nudger roll 13 for conveying the documents on the document tray 11 lifted by the tray lifter 12, a feed roll 14 for conveying further downstream the documents conveyed by the nudger roll 13, and a retard roll 15 for receiving the documents supplied by the nudger roll 13 and separating the documents from one another.

A first conveying path 31 for first conveying the documents is provided with take-away rolls 16, pre-registration rolls 17, registration rolls 18, a platen roll 19, and out rolls 20. The take-away rolls 16 convey, to rolls located downstream therefrom, each of the documents separated from one another. The pre-registration rolls 17 convey the document further to rolls located downstream thereof, and shape the document into a loop. The registration rolls 18 stop the rotation thereof, and then restart the rotation at appropriate timing and supply the document to a document reading mechanism while adjusting the registration. The platen roll 19 assists the conveyance of the document being read. The out rolls 20 convey the read document further downstream.

The above-described rolls form a document feeding unit. Further, the first conveying path 31 serving as a conveying path is also provided with a baffle 41 which rotates around a fulcrum in accordance with the state of the loop of the document being conveyed. Further, a contact image sensor (CIS) 50 is provided between the platen roll 19 and the out rolls 20.

On the downstream side of the out rolls 20, a second conveying path 32 and a third conveying path 33 are provided. Further, a conveying path switch gate 42, a discharge tray 40, and first discharge rolls 21 are provided. The conveying path switch gate 42 switches between the second conveying path 32 and the third conveying path 33. The discharge tray 40 carries the documents subjected to the reading operation and stacked thereon. The first discharge rolls 21 discharge the documents onto the discharge tray 40.

Further, a fourth conveying path 34, an inverter roll 22, an inverter pinch roll 23, a fifth conveying path 35, a sixth conveying path 36, second discharge rolls 24, and an exit switch gate 43 are provided. The fourth conveying path 34 switches back the document conveyed through the third conveying path 33. The inverter roll 22 and the inverter pinch roll 23 are provided to the fourth conveying path 34 to perform an actual switch-back operation of the document. The fifth conveying path 35 guides the document switched back by the fourth conveying path 34 back to the first conveying path 31 provided with the pre-registration rolls 17 and so forth. The sixth conveying path 36 discharges, to the discharge tray 40, the document switched back by the fourth conveying path 34. The second discharge rolls 24 are provided to the sixth conveying path 36 to convey, to the first discharge rolls 21, the document to be inverted and discharged. The exit switch gate 43 switches between the fifth conveying path 35 and the sixth conveying path 36. The third conveying path 33, the fourth conveying path 34, and the fifth conveying path 35 form an inverting conveying path.

In a standby state, the nudger roll 13 is lifted up and retained at a retract position. Meanwhile, in a document conveying operation, the nudger roll 13 is lowered to a nip position, i.e., a document conveying position to convey the top document on the document tray 11. The nudger roll 13 and the feed roll 14 convey the document, when connected with a not-illustrated feed clutch. The pre-registration rolls 17 push the leading end of the document against the stopped registration rolls 18 to shape the document into a loop. During the process of shaping the document into a loop, the registration rolls 18 move the leading end of the document pinched thereby back to a nip position. As the loop is formed, the baffle 41 opens around the fulcrum, and thus functions without obstructing the loop of the document. Further, the take-away rolls 16 and the pre-registration rolls 17 hold the loop during the reading operation.

With the formation of the loop, the read timing is adjusted, and a skew occurring along with the conveyance of the document in the reading operation is suppressed. Accordingly, the position adjustment function is improved. In synchronization with the start of the reading operation, the stopped registration rolls 18 start rotating, and the platen roll 19 presses the document against a later-described second platen glass 72B. Thereby, the image data of the document is read from the lower side.

When the reading operation of a one-sided or simplex document is completed, or when the simultaneous duplex reading operation of a two-sided or duplex document is completed, the conveying path switch gate 42 performs the switching operation such that the document passed through the out rolls 20 is guided into the second conveying path 32 and discharged onto the discharge tray 40.

Meanwhile, in the sequential reading of the two surfaces of the duplex document, the conveying path switch gate 42 performs the switching operation such that the document is guided into the third conveying path 33 to be inversed. In the sequential reading of the two surfaces of a duplex document, the inverter pinch roll 23 is retracted in the OFF state of the not-illustrated feed clutch. Thereby, the nip is released, and the document is guided into the fourth conveying path 34 serving as an inverter path. Thereafter, the inverter pinch roll 23 forms a nip, and the inverter roll 22 guides the document to be inverted to the pre-registration rolls 17, or conveys the document to be inverted and discharged to the second discharge rolls 24 on the sixth conveying path 36.

The scanner device 70 is provided with the above-described document feeding device 10. Further, the scanner device 70 includes a device frame 71 for supporting the document feeding device 10, and reads the image of the document conveyed by the document feeding device 10. In the scanner device 70, the device frame 71 includes a first platen glass 72A and the second platen glass 72B. The first platen glass 72A carries thereon the document, the image of which is to be read, in a stationary state. The second platen glass 72B forms an opening portion for passing therethrough the light used to read the document being conveyed by the document feeding device 10. The document feeding device 10 is attached to the scanner device 70 to be swingable around a fulcrum set on the far side of the drawing. To set a document on the first platen glass 72A, the document feeding device 10 is lifted to place the document on the first platen glass 72A. Thereafter, the document feeding device 10 is lowered toward the scanner device 70 to press the document.

The scanner device 70 further includes a full-rate carriage 73 and a half-rate carriage 75. The full-rate carriage 73 serves as a second document reading mechanism and rests under the second platen glass 72B, and scans the document over the entire area of the first platen glass 72A to read the image of the document. The half-rate carriage 75 provides an imaging unit with the light obtained from the full-rate carriage 73. The full-rate carriage 73 corresponds to the second document reading mechanism 102 includes an illumination lamp 74 for illuminating the document with light, and a first mirror 76A for receiving the reflected light obtained from the document. Further, the half-rate carriage 75 includes a second mirror 76B and a third mirror 76C for supplying the imaging unit with the light obtained from the first mirror 76A.

Further, the scanner device 70 includes an imaging lens 77 for optically reducing the size of an optical image obtained from the third mirror 76C, a charge-coupled device (CCD) image sensor 78 for photoelectrically converting the optical image formed by the imaging lens 77, and a drive substrate 79 provided with the CCD image sensor 78. The image signal obtained by the CCD image sensor 78 is sent to the processing device 80 via the drive substrate 79.

In this case, in the reading operation of the image of the document placed on the first platen glass 72A, the full-rate carriage 73 and the half-rate carriage 75 move at a speed rate of two to one in the scanning direction indicated by an arrow in the drawing. In this process, the light emitted from the illumination lamp 74 of the full-rate carriage 73 is applied to the read surface of the document, and the reflected light from the document is sequentially reflected by the first mirror 76A, the second mirror 76B, and the third mirror 76C in this order to be guided to the imaging lens 77. The light guided to the imaging lens 77 is formed into an image on a light receiving surface of the CCD image sensor 78. The CCD image sensor 78, which is a one-dimensional sensor, processes one line of data at the same time. After one line of data in the line direction, i.e., the main scanning direction is read, the full-rate carriage 73 is moved in a direction perpendicular to the main scanning direction, i.e., the sub scanning direction to read the next line of the document. The above-described operation is performed over the entire size of the document, and the reading operation of one page of the document is completed. The full-rate carriage 73 and the half-rate carriage 75 move in a direction indicated as "SCAN" in FIG. 12 as the reading operation proceeds. At the completion of the reading operation of one page of the document, the full-rate carriage 73 and the half-rate carriage 75 move to the respective positions where the full-rate carriage 73 and the half-rate carriage 75 are illustrated with a long dashed double dotted line on the right side of FIG. 6.

Meanwhile, the second platen glass 72B is formed by, for example, a transparent glass plate having an elongated plate-like structure. The document conveyed by the document feeding device 10 passes over the second platen glass 72B. In this process, the full-rate carriage 73 and the half-rate carriage 75 rest at the respective positions illustrated with a solid line on the left side of FIG. 6. The reflected light from the first line of the document having passed the platen roll 19 of the document feeding device 10 is first reflected by the first mirror 76A, the second mirror 76B, and the third mirror 76C, and is formed into an image by the imaging lens 77. Then, the image is read by the CCD image sensor 78 serving as a second sensor of the present example embodiment. That is, one line of data in the main scanning direction is processed at the same time by the CCD image sensor 78 as a one-dimensional sensor, and thereafter the next line of data in the main scanning direction of the document conveyed by the document feeding device 10 is read. The leading end of the document reaches a reading position on the second platen glass 72B, and then the document passes the reading position on the second platen glass 72B. Thereby, the reading operation of one page in the sub scanning direction is completed.

In the stopped state of the full-rate carriage 73 and the half-rate carriage 75, and during the conveyance of the document to read the first surface of the document on the second platen glass 72B by using the CCD image sensor 78, it is possible to read the second surface of the document substantially simultaneously (i.e., not exactly simultaneously, but during the same document conveying operation) by using the CIS 50. That is, with the use of the CCD image sensor 78 and the CIS 50, it is possible to read the respective images of the front and rear surfaces of the document during one operation of conveying the document into the conveying path.

Figure 7:
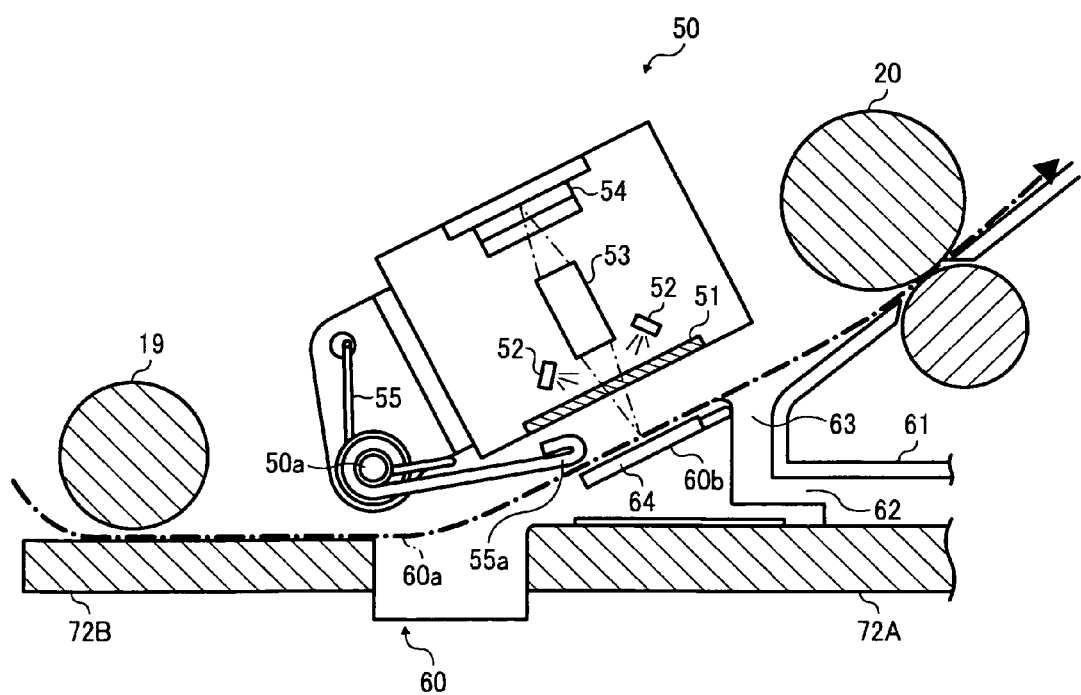
FIG. 7 is a diagram for explaining a reading structure using a CIS as an image sensor unit.

FIG. 7 is a diagram for explaining a reading structure using the CIS 50 that serves as a first image sensor unit. As illustrated in FIG. 7, the CIS 50 is provided between the platen roll 19 and the out rolls 20. One surface, i.e., the first surface of the document is pressed against the second platen glass 72B, and the image of the first surface is read by the CCD image sensor 78. Meanwhile, the CIS 50 reads the image of the other surface, i.e., the second surface of the document from the other side facing the second platen glass 72B across the conveying path for conveying the document. The CIS 50 includes a glass 51, light emitting diodes (LEDs) 52 for applying light to the second surface of the document through the glass 51, a SELFOC™ lens 53 formed by a lens array for collecting the reflected light from the LEDs 52, and a line sensor unit 54 for reading the light collected by the SELFOC™ lens 53.

As the line sensor unit 54, a CCD sensor, a complementary metal oxide semiconductor (CMOS) sensor, close-contact sensor, and so forth can be used. The line sensor unit 54 is capable of reading the full width (e.g., 297 millimeters corresponding to the longitudinal width of the A4 size sheet) of image. The CIS 50 reads the image by using the SELFOC™ lens 53 and the line sensor unit 54, without using a reduction optical system. It is therefore possible to simplify the structure of the CIS 50 and reduce the size of the housing of the CIS 50. Accordingly, the power consumption can be reduced. To read a color image, LED light sources corresponding to three colors of R (Red), G (Green), and B (Blue) may be used in combination as the LEDs 52, and a set of three sensors corresponding to three colors of R, G, and B may be used as the line sensor unit 54.

Further, on the conveying path forming the reading structure for performing the image reading operation with the CIS 50, a control member 55 and a contact member 60 are provided. The control member 55 extends from the housing of the CIS 50. The contact member 60 comes into contact with the document pressed by the control member 55. The control member 55 is attached to the document feeding device 10 (see FIG. 6) via the CIS 50, while the contact member 60 is attached to the scanner device 70 (see FIG. 6).

Further, a guide member 61, an opening portion 63, and a dust storage unit 62 are provided. The guide member 61 is provided downstream of the contact member 60. The opening portion 63 is formed between the guide member 61 and the contact member 60. The dust storage unit 62 is located below the guide member 61 to communicate with the opening portion 63, and serves as a collection unit for storing dust and impurities adhering to a surface of the document. The control member 55 and the contact member 60 are provided in a direction perpendicular to the document conveying path, i.e., in a direction from the front side to the rear side of the document feeding device 10 in accordance with the position of the conveying path, and extend from the front side to the rear side of the document feeding device 10.

In this case, the control member 55 is formed by a plate spring made of a substantially L-shaped metal sheet wound around a shaft 50a provided to the CIS 50. With the flexibly configured control member 55, the thickness of the document conveyed thereto is absorbed, and even a folded document is safely conveyed. Further, the leading end of the control member 55 extends to a position near the reading position of the CIS 50, and a portion of the control member 55 in contact with the document is provided with a folded portion 55a having a folded hem. Therefore, the control member 55 smoothly comes into contact with the document, and the generation of paper dust and so forth is prevented. The distance between the folded portion 55a of the control member 55 and the contact member 60, i.e., the gap for passing the document therethrough is set to be approximately 0.1 millimeters to approximately 1.0 millimeters.

Meanwhile, the contact member 60 includes a conveying surface 60a and a recessed surface 60b. The conveying surface 60a is provided at an upstream position in the document conveying direction, and guides the conveyed document. The recessed surface 60b is provided downstream of the conveying surface 60a in the document conveying direction, and is recessed from the conveying surface 60a. Further, the recessed surface 60b is formed to face the extension of the focus point of the light collected by the SELFOC™ lens 53. A white reference tape 64 formed by a biaxially-drawn polyester film and serving as a white reference member is adhered to the recessed surface 60b. Therefore, the white reference tape 64 is attached to the scanner device 70 via the contact member 60. Further, the upper surface of the white reference tape 64 is exposed to the conveying path.

The CIS 50 uses the SELFOC™ lens 53 as an optical imaging lens. Therefore, the CIS 50 has a relatively shallow depth of focus (field) of approximately ±0.3 millimeters, which is approximately one-thirteenth or less of the depth of focus (field) of the scanner device 70. In the reading operation by the CIS 50, therefore, it is necessary to set the document reading position within a predetermined narrow range. In view of this, the above-described control member 55 is provided to form a configuration in which the document is conveyed while being pressed against the contact member 60 by the control member 55 to stably control the posture of the document between the platen roll 19 and the out rolls 20. The long and short dashed arrow in FIG. 7 indicates the movement of the document in the configuration provided with the control member 55. It is understood that the document is conveyed while being brought into contact with the contact member 60 by the control member 55. With this configuration, the height of the document at the reading position is kept substantially constant. Accordingly, the accuracy of focus adjustment is improved in the configuration using the CIS 50 having a relatively shallow depth of field.

With a combination of the above-described document feeding device 10 and the above-described scanner device 70, the first document reading mechanism 101 and the second document reading mechanism 102 can be realized. That is, the duplex document reading mechanism 101 is fixedly disposed to read the image of a moving document that is being moved and the above-described scanner device 70 that corresponds to the second document reading mechanism 102 is fixed when reading a different side of the moving document and moves when reading the image of a fixed document by moving an optical system to scan the document. With the use of these units, during the conveyance of a document to read the first surface of the document by using the CCD image sensor, it is possible to read the second surface of the document substantially simultaneously (i.e., not exactly simultaneously, but during the same document conveying operation) by using the CIS 50. That is, with the use of the CCD image sensor 78 and the CIS 50, it is possible to read the respective images of the front and rear surfaces of a document during one operation of conveying the document into the conveying path.

To scan and read a fixed document by using a reduction optical system, the duplex document reading mechanism 101 uses the CCD image sensor 78 used in the image reading operation using the CCD image sensor 78. The CIS 50 used in this case is a so-called contact image sensor which uses a small-sized light emitting diode (LED) as a light source to reduce the size of a device, and which directly reads an image through a lens by using a linear sensor. The above-described document reading mechanism performs the reading operation as a monochrome scanner. To read a color image, LED light sources corresponding to three colors of R (Red), G (Green), and B (Blue) may be used in, combination as LEDs, and a set of three sensors corresponding to three colors of R, G, and B may be used as a line sensor unit. Further, it is not always necessary to use the LED as the illumination light source. Therefore, a xenon light source and so forth may be used as the illumination light source.

Figure 8:
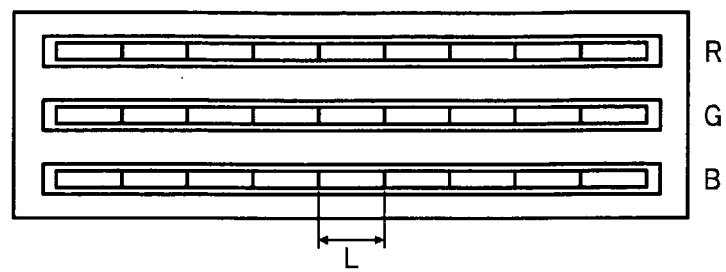
FIG. 8 is a diagram illustrating an image sensor including a plurality of sensor chips arranged in a line.
Figure 9:
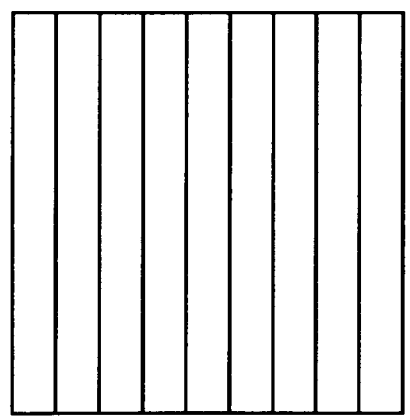
FIG. 9 is an explanatory diagram of an abnormal image with a striped pattern.

As the image sensors used in the above-described CIS 50, a plurality of image sensor chips arranged in a line, as illustrated in FIG. 8, are usually used. FIG. 8 illustrates three lines each including nine sensors. However, the number of the sensors is, of course, not limited to nine. Practically, each chip is formed by approximately three hundred pixels, and approximately twenty-five chips form a scanner having a length corresponding to the longitudinal length of the A4 size sheet. The three lines of sensors in FIG. 8 correspond to sensors for reading the RGB signals, respectively. In FIG. 8, L represents the width of each of the sensor chips forming one multi-chip image sensor or first image sensor unit. The reading characteristic varies by this width. Therefore, in the reading operation by the thus configured multi-chip image sensor, if the variation is substantially large, an abnormal image with a striped pattern as illustrated in FIG. 9 is formed.

To prevent such an abnormal image, a color space conversion technique for absorbing the difference in characteristic among chips has been disclosed. With the use of such a technique, severe color irregularities as described above can be prevented. Even with this technique, however, it is difficult to perfectly equalize the characteristics of the chips. If the characteristics of the chips are unequal, color irregularities may stand out in and around an area to which humans are highly sensitive due to the human visual characteristic. For example, if a chromatic document having a uniform area substantially corresponding to a plurality of image sensor chips is read, and if the uniform area is of a deep blue color and is adjacent to another blue color slightly different from the deep blue color, the difference between the two colors is hardly noticed by the human eye. Even if the difference is noticed by the human eye, such a difference is unlikely to cause uncomfortable feeling to people.

In the case of an achromatic document, however, if the color reproduced on the basis of the reading by one sensor chip is achromatic while the color reproduced on the basis of the reading by an adjacent sensor chip is slightly colored, even a similar degree of difference in color is substantially easily noticed by the human eye due to the human visual characteristic. Further, if the difference is noticed by the human eye, such a difference is likely to cause uncomfortable feeling to people.

The color irregularities tend to stand out in a low-chroma area. In fact, the chroma value measured in an achromatic area with visible color irregularities is approximately 3 to 4, while the maximum chroma value is 255. With a process of reducing the chroma only in low-chroma areas and maintaining the chroma in the other areas, therefore, it is possible to suppress the color irregularities occurring in a read image due to the characteristic variation in a multi-chip image sensor, while substantially preserving the color reproduction quality.

Specifically, with reference to a chroma conversion table containing the values based on the graph illustrated in FIG. 4, the processing described above can be performed. In the graph illustrated in FIG. 4, Clim represents the limit value of the chroma data of the input image for performing chroma reduction processing. Pixels having a chroma higher than the limit value are not subjected to the chroma reduction processing. The chroma conversion processing of the present example embodiment basically degrades the color reproduction, if performed on a normal chromatic area. If the chroma is substantially reduced in an area having a relatively high chroma, the originally intended color reproduction is sacrificed for the effect of suppressing the color irregularities attributed to the multi-chip image sensor.

As described above, however, the above-described processing is intended to be effectively performed only on an area having a substantially low chroma. Therefore, the processing does not affect a so-called bright color. However, the processing is not desirable in terms of the color reproduction of a chromatic, image, and thus is not recommended unless there is a benefit. The variation in a multi-chip image sensor fluctuates within a certain range, and different users request different levels. Therefore, if the value Clim, which is illustrated in FIG. 4 as the value at and below which the chroma reduction is performed, is previously set to be changeable to a plurality of levels, it is possible to provide images closer to the level desired by users.

Figure 10:
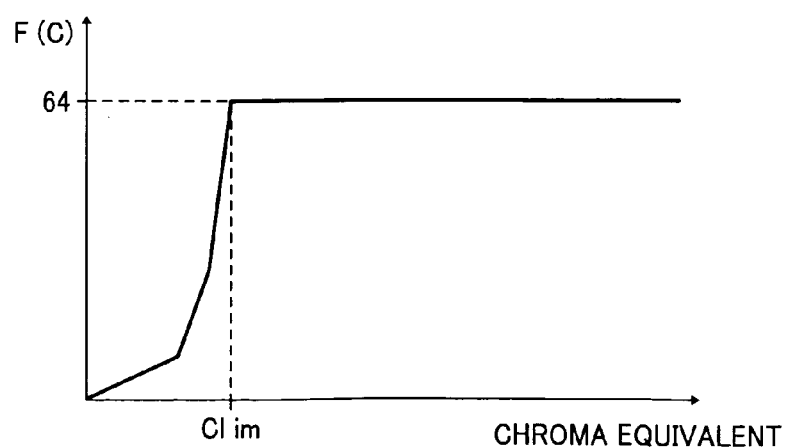
FIG. 10 is another graph illustrating the relationship between the function and the chroma equivalent.

FIGS. 10 and 11 illustrate examples of graphs illustrating changes in the values stored in the chroma conversion table when the value Clim is changed to a plurality of levels. In this case, as the value Clim increases, the influence of the chroma conversion increases. If the characteristic variation among the chips forming a multi-chip image sensor is relatively large, the setting as illustrated in FIG. 11 with a relatively large Clim value may be used. Meanwhile, if the characteristic variation among the chips forming a multi-chip image sensor is relatively small, the setting as illustrated in FIG. 10 with a relatively small Clim value may be used. With the setting as illustrated in FIG. 11, the color irregularities in an image are reduced, and the color reproduction of an achromatic document is improved. At the same time, however, the color reproduction of a chromatic document is degraded.

Users are recommended to set the Clim value to a level at which the color irregularities in an achromatic document is acceptable, and to avoid setting the Clim value higher than the level. Further, the present example embodiment illustrates the examples of three levels in FIGS. 4, 10, and 11. However, the number of the levels is not limited to three. Thus, the Clim value may be set to a larger number of levels.

Configuration examples of a system including the above-described image processing device 100 will now be described.

It is to be noted that in the image processing device 100 of the present example embodiment, three reading methods (described in detail below) are available. In the second and third methods, the same CCD image sensor 78 reads the image. By contrast, according to the first method, in the duplex document reading mechanism 101 which reads the image of a document while moving the document by using the ADF or document feeding device 10, the image is read by the multi-chip image sensor or CIS 50. According to the second method, in the duplex document reading mechanism 101 which reads the image of a document while moving the document by using the ADF or document feeding device 10, the image is read by the CCD image sensor 78. According to the third method, in the second document reading mechanism 102 which reads the image of a fixed document by using a reduction optical system such as the full-rate carriage 73 or the second document reading mechanism 102, the image is read by the CCD image sensor 78. In this case, the CCD image sensor 78 used in the second method is used.

First System Example

A first system example will be described. As described above, in terms of the color reproduction of a chromatic image, the chroma reduction processing performed in the present example embodiment runs counter to the intention to reproduce colors faithful to the original colors of a document, and thus is not desirable. Therefore, the processing is not recommended unless there is a benefit to be had in some other respect. Put simply, the processing for suppressing the color irregularities attributed to the multi-chip image sensor is considered to be preferably applied only to the first method the image is read by the multi-chip image sensor or the CIS 50. By contrast, the CCD image sensor 78 does not cause such color irregularities. In the methods using the CCD image sensor 78, therefore, there is no suppression of color irregularities, and only the color reproduction adverse affected.

In the present example embodiment, the image read by the CCD image sensor 78 and the image read by the CIS 50 are alternately sent from the duplex document reading mechanism 101 to the scanner correction unit 104 under the memory control. As described above, the chroma conversion table containing the values illustrated in FIG. 4 is set for the image read by the CIS 50. Meanwhile, a chroma conversion table containing the values illustrated in FIG. 12 is set for the image read by the CCD image sensor. FIG. 12 corresponds to the setting in which the Clim value is zero, i.e., the setting for preventing the chroma conversion processing. The above-described settings are performed in synchronization with the memory control.

Second System Example

A second system example will be described. When both surfaces of a document are read, it is ideal that the respective images of the front and rear surfaces of a document ultimately available to a user are of substantially the same quality. In the document reading operation by the duplex document reading mechanism 101, therefore, it is desirable to perform the same processing in both of the first and second methods for users who want to obtain images of similar quality from the both surfaces of a document. For the users having the above-described request, it is desirable to provide an image processing device which performs the chroma conversion processing by using the same chroma conversion table for the front and rear surfaces of a document.

In this case, if the duplex reading of a duplex document is not performed, that is, if only one side of a document is read, the reading operation according to the second method is simply performed. In this case, the reading operation by the CIS 50 is not performed, and thus it is unnecessary to perform the chroma conversion processing for suppressing the color irregularities. Therefore, whether or not to perform color irregularity correction based on chroma adjustment should be determined depending on whether the document reading is for a one-sided document (simplex document) or a two-sided document (duplex document). In view of this, the chroma conversion table containing the values illustrated in FIG. 4 is set only when the user specifies duplex document reading on a not-illustrated operation screen. In all other cases, the chroma conversion table containing the values illustrated in FIG. 12 is set.

Third System Example

A third system example will be described. In actual usage by users, documents are often read in a fixed state, i.e., in a so-called book-reading operation, as in the third method. In this case, it is unlikely that the image obtained by the third method is compared with the image obtained by the first or second method. It is rather considered that only an image faithful to the document is sought in the third method. In such usage, therefore, the chroma conversion processing performed in the present example embodiment is not unnecessarily performed on the image obtained by the third method. In this case, the chroma conversion table containing the values illustrated in FIG. 12 is set.

Fourth System Example

As a fourth system example, it is to be noted that although there are system configurations like those described above, in practice the optimal system varies depending on what the user wants. Therefore, as one option, the device provided to users may be fixed to a particular system which is believed to be most wanted by users. However, it is more desirable to provide users with a plurality of systems such that the user can switch among the systems:

FIG. 13 illustrates the settings for the first to third reading methods, wherein ON indicates the setting of the chroma conversion table containing the values of FIG. 4 for performing the chroma reduction processing on a low-chroma area, and OFF indicates the setting of the chroma conversion table containing the values of FIG. 12 for preventing the chroma conversion processing.

In the first setting, the color irregularity suppression processing based on the chroma conversion is ON in all methods. Basically, the chroma conversion processing is considered unnecessary in the second and third methods. With this setting, however, it is possible to obtain consistent images regardless of which one of the reading methods is used to read the document. In the image of a low-chroma area, however, the chroma is lower than in an image reproduced faithful to the document, and the gradation quality is slightly degraded. This setting may not be suitable for users who demand highly accurate color reproduction. Users in general, however, are often less tolerant of conspicuous color irregularities in a low-chroma area. This setting can provide practically acceptable images to users who do not mind some sacrifice of the color reproduction quality in a low-chroma area.

In the second setting, the color irregularity suppression processing based on the chroma conversion is OFF only in the fixed document reading method. In the duplex document reading performed by the ADF or document feeding device 10, therefore, the respective images of the front and rear surfaces of a document are consistent. If the adverse effect of the chroma conversion processing is serious in the reading operation by the ADF or document feeding device 10, the reading operation may be performed by the fixed document reading method. However, there arises a difference in a low-chroma area between the image of a simplex document read by the fixed document reading method and the image of the document read by the ADF or document feeding device 10. Therefore, this setting is suitable for users who care about the difference between the respective images of the front and rear surfaces of a duplex document.

In the third setting, the color irregularity suppression processing based on the chroma conversion is ON only in the reading operation using the CIS 50 of the duplex document reading mechanism 101. With this setting, it is possible to perform the color irregularity suppression processing based on the chroma conversion only when the processing is absolutely necessary, and to prevent unnecessary image deterioration in the reading operation using the CCD image sensor 78. Further, the difference in image caused by the chroma conversion processing does not occur between the image of a simplex document read by the fixed document reading method and the image of the document read by the ADF or document feeding device 10. In the duplex document reading operation, however, there arises a difference between the respective images of the front and rear surfaces of a document. Therefore, this setting is suitable for users who can accept some deterioration in the image quality in the image of the rear surface in the duplex document reading operation.

In the fourth setting, the color irregularity suppression processing based on the chroma conversion is always OFF. Therefore, an abnormality of color irregularities occurs in a low-chroma area. However, this setting has no disadvantage in the reading operation of a document not containing such a low-chroma area. Rather, this setting always provides color reproduction faithful to the document. As a usage example, therefore, this setting may be normally turned ON, and may be switched to one of the first to third settings when necessary. Users who find such a switching operation complicated and troublesome can set one of the first to fourth settings as the default setting, depending on the intended use.

In the present example embodiment described above, the first to fourth settings are available. Alternatively, ON-OFF combinations other than the above-described combinations may be set for the first to third methods.

Further, in the present example embodiment described above, the image of the front surface and the image of the rear surface read by the ADF or document feeding device 10 are alternately input to the scanner correction unit 104, and the respective appropriate parameters are set for the two types of images in synchronization with the input of the respective images. Alternatively, the example embodiment may be configured to include two scanner correction units and two image compression units to separately set the parameters. In this case, alternate switching between the parameters is not performed in the duplex document reading operation, but the respective appropriate parameters are set for the two devices. However, the nature of the present patent application is retained also in this case. That is, the chroma conversion table containing the values illustrated in FIG. 4 may be set for an image path for performing the color irregularity correction, while the chroma conversion table containing the values illustrated in FIG. 12 may be set for an image path for preventing the color irregularity correction.

The image processing device 100 of the present example embodiment may be applied to a system configured to include a plurality of devices including a host computer, an interface device, a scanner, a printer, a copier, and a multifunctional machine, for example. The image processing device 100 of the present example embodiment may also be applied to an apparatus configured to include a single device, such as a host computer, an interface device, a scanner, a printer, a copier, and a multifunctional machine, for example.

It is also possible to provide a system or apparatus with a recording medium recorded with a program, i.e., software program code for realizing the functions of the above-described image processing device 100, and to realize the functions of the image processing device 100 by causing a computer, a CPU, a microprocessor unit (MPU), or a digital signal processor (DSP) of the system or apparatus to execute the program stored in the recording medium. In this case, the program read from the recording medium realizes the respective functions of the above-described image processing device 100. Therefore, the program or the recording medium storing the program corresponds to the configuration according to the example embodiment of the present patent application.

As the recording medium for providing the above-described program code, an optical recording medium, a magnetic recording medium, a magneto-optical recording medium, and a semiconductor recording medium can be used. These recording media include, for example, a floppy disk (FD), a hard disk, an optical disk, a magneto-optical disk, a compact disk-read-only memory (CD-ROM), a compact disk-recordable (CD-R), a magnetic tape, a nonvolatile memory, and a read-only memory (ROM).

With the execution of the program read by the computer, the functions of the above-described image processing device 100 are realized. Needless to say, the functions of the image processing device 100 may be realized when an operating system (OS) or the like operating on the computer performs a part or all of the actual processing on the basis of the instruction from the program.

It is also needless to say that the program read from the recording medium may be written in a function expansion board inserted in the computer or a memory of a function expansion unit connected to the computer, and that the functions of the above-described image processing device 100 may be realized when a CPU or the like of the function expansion board or the function expansion unit performs a part or all of the actual processing on the basis of the instruction from the program.

According to the image processing device 100 of the present example embodiment, the chroma reduction conversion is performed only on a low-chroma image signal by the use of the chroma adjustment device. Accordingly, it is possible to suppress the color irregularities occurring at intervals corresponding to the widths of the chips forming the multi-chip image sensor.

Further, the upper limit of the chroma value for performing the chroma reduction processing is adjustably set. Accordingly, it is possible to reduce the chroma only in a chroma area in which the chroma reduction processing is really necessary.

Further, when the duplex document reading mechanism 101 reads a document by using a multi-chip image sensor to read one surface of the document and using an image sensor other than the multi-chip image sensor, e.g., a CCD image sensor to read the other surface of the document, the chroma conversion processing capable of suppressing the color irregularities is performed only on the image read by the multi-chip image sensor. Accordingly, it is possible to prevent an unnecessary change in the image read by the CCD image sensor.

Further, in the reading operation of a duplex document by the duplex document reading mechanism 101, the color irregularities in the image read by the multi-chip image sensor are prevented, and the respective images of two surfaces of the document have similar changes in chroma. Further, in the simplex reading operation, only an image sensor other than the multi-chip image sensor, e.g., a CCD image sensor is used to obtain the image, and the chroma conversion processing for suppressing the color irregularities is not performed. Accordingly, it is possible to prevent an unnecessary change in the image read by the CCD image sensor.

Further, the image processing device 100 including both the duplex document reading device (i.e., the ADF-type reading device) and the book reading device (i.e., the reading device which scans a document fixed on a contact glass by using a scanner) employs three reading methods: the reading of one surface of a document in ADF reading (i.e., the reading using a multi-chip image sensor), the reading of the other surface of the document in ADF reading (i.e., the reading using an image sensor other than the multi-chip image sensor, e.g., a CCD image sensor), and book-reading (i.e., the reading using an image sensor other than the multi-chip image sensor, e.g., a CCD image sensor). In the use of the three reading methods, the image processing device 100 is capable of performing desired chroma conversion processing to, for example, suppress the color irregularities, obtain images of similar quality from the book-reading and the ADF reading, and obtain images of similar quality from the front and rear surfaces of a document in the ADF reading.

Further, in the reading operation of a duplex document by the duplex document reading mechanism 101, the color irregularities in the image read by the multi-chip image sensor are prevented. Meanwhile, in the book-reading, only an image sensor other than the multi-chip image sensor, e.g., a CCD image sensor is used to obtain the image, and the chroma conversion processing for suppressing the color irregularities is not performed. Accordingly, it is possible to prevent an unnecessary change in the image read by the CCD image sensor.

Further, it is possible to provide an image forming apparatus satisfying a desired image quality by providing the image forming apparatus with the image processing device 100 of the present example embodiment.

Further, with the execution of the program code, it is possible to cause a device such as a facsimile machine, a printer, a scanner, a copier, a multifunctional machine, and a personal computer to realize the above-described functions.

The above-described example embodiments are illustrative and do not limit the present patent application. Thus, numerous additional modifications and variations of the present patent application are possible in light of the above teachings. For example, elements at least one of features of different illustrative and example embodiments herein may be combined with each other at least one of substituted for each other within the scope of this disclosure and appended claims. Further, features of components of the example embodiments, such as the number, the position, and the shape are not limited the example embodiments and thus may be preferably set. It is therefore to be understood that within the scope of the appended claims, the disclosure of the present patent application may be practiced otherwise than as specifically described herein.

The invention claimed is:

1. An image processing device, comprising:
a first image sensor unit including multiple image sensor chips arranged in a line to read an image of a document by converting light incident from the document into electrical signals;
a chroma calculation unit configured to calculate chroma data from an image signal constituted by the electrical signals of the image read by the first image sensor unit; and
a chroma adjustment unit configured to adjust the chroma by using the chroma data calculated by the chroma calculation unit to perform, only on a low-chroma image signal, a conversion process for reducing the chroma to suppress color irregularities occurring at intervals corresponding to widths of the multiple image sensor chips of the first image sensor unit.

2. The image processing device according to claim 1, wherein the chroma adjustment unit is configured to reduce the chroma of only image data having a chroma equal to or less than a predetermined first value.

3. The image processing device according to claim 2, wherein the predetermined first value is varied according to a specified second value.

4. The image processing device according to claim 1, further comprising a first document reading mechanism in which the first image sensor unit is incorporated,
the first document reading mechanism further incorporating a second image sensor unit different from the first image sensor unit,
the first document reading mechanism being configured to perform duplex document reading by reading an image of a first side of a document by using the first image sensor unit and reading an image of a second side of the document by using the second image sensor unit,
wherein the chroma adjustment unit is configured such that the suppression of color irregularities is performed only on the image read by the first document sensor unit of the first document reading mechanism.

5. The image processing device according to claim 4, wherein the first document reading mechanism further comprises a second document reading mechanism movable in a direction of movement of the document,
the second document reading mechanism being configured to rest at a fixed position when reading an image of a moving document that is being moved, and move when reading an image of a fixed document that is placed at a position for document reading,
the first document reading mechanism being configured to use the first image sensor unit to read the image of the first side of the document and the second image sensor unit to read the image of the second side of the document, and the second document reading mechanism being configured to use the second image sensor unit to read the images of the first and second sides of the document,
where the chroma adjustment unit is configured such that the suppression of color irregularities is performed selectively on three types of image data,
the three types of image data comprising the image of the moving document read by the first image sensor unit, the image of the moving document read by the second image sensor unit, and the image of the fixed document read by the second image sensor unit.

6. The image processing device according to claim 5, wherein the suppression of color irregularities is not performed on the image of the fixed document read by the second image sensor unit.

7. The image processing device according to claim 1, further comprising a first document reading mechanism in which the first image sensor unit is incorporated,
the first document reading mechanism further incorporating a second image sensor unit different from the first image sensor unit,
the first document reading mechanism being configured to perform duplex document reading by reading an image of a first side of a document by using the first image sensor unit and read an image of a second side of the document by using the second image sensor unit,
wherein the chroma adjustment unit is configured such that the suppression of color irregularities is performed on both the image read by the first image sensor unit and the image read by the second image sensor unit according to results obtained by which the first document reading mechanism reads the first and second sides of the document, wherein the chroma adjustment unit is configured such that the suppression of color irregularities is not performed on the image read by the second image sensor unit according to results obtained by which the first document reading mechanism reads only one side of the document.

8. The image processing device according to claim 7, wherein the first document reading mechanism further comprises a second document reading mechanism movable in a direction of movement of the document, the second document reading mechanism being configured to rest at a fixed position when reading an image of a moving document that is being moved, and move when reading an image of a fixed document that is placed at a position for document reading, the first document reading mechanism being configured to use the first image sensor unit to read the image of the first side of the document and the second image sensor unit to read the image of the second side of the document, and the second document reading mechanism being configured to use the second image sensor unit to read the images of the first and second sides of the document, wherein the chroma adjustment unit is configured such that the suppression of color irregularities is performed selectively on three types of image data, the three types of image data comprising the image of the moving document read by the first image sensor unit, the image of the moving document read by the second image sensor unit, and the image of the fixed document read by the second image sensor unit.

9. The image processing device according to claim 8, wherein the chroma adjustment unit is configured such that the suppression of color irregularities is not performed on the image of the fixed document read by the second image sensor unit.

10. An image forming apparatus, comprising:
the image processing device according to claim 1; and
an image forming unit configured to form an image based on image data output from the image processing device and transfer the formed image onto a recording medium.

11. An image processing method, comprising:
reading an image of a document by using a first image sensor unit including multiple image sensor chips arranged in a line to convert light incident from the document into electrical signals;
calculating chroma data from an image signal constituted by the electrical signals of the image read at the reading;
adjusting the chroma by using the chroma data calculated at the calculating; and
performing, only on a low-chroma image signal, a conversion process for reducing the chroma based on the adjusting to suppress color irregularities occurring at intervals corresponding to widths of the multiple image sensor chips of the first image sensor unit.

12. A program product comprising a non-transitory computer-usable medium having computer-readable program code embodied thereon for causing a computer to perform an image processing method, the method comprising:
reading an image of a document by using a first image sensor unit including multiple image sensor chips arranged in a line to convert light incident from the document into electrical signals;
calculating chroma data from an image signal constituted by the electrical signals of the image read at the reading;
adjusting the chroma by using the chroma data calculated at the calculating; and
performing, only on a low-chroma image signal, a conversion process for reducing the chroma based on the adjusting to suppress color irregularities occurring at intervals corresponding to widths of the multiple image sensor chips of the first image sensor unit.

* * * * *